(12) United States Patent
Mills (10) Patent No.: US 8,775,271 B2
(45) Date of Patent: *Jul. 8, 2014

(54) METHOD, MEDIUM, AND SYSTEM FOR AUTOMATED CREATION OF MONTAGE OF MATCHING PRODUCTS

(75) Inventor: Joshua S. Mills, Marlborough, MA (US)

(73) Assignee: Vistaprint Schweiz GmbH, Winterthur (CH)

( * ) Notice: Subject to any disclaimer, the term of this patent is extended or adjusted under 35 U.S.C. 154(b) by 615 days.

This patent is subject to a terminal disclaimer.

(21) Appl. No.: 12/982,867

(22) Filed: Dec. 30, 2010

(65) Prior Publication Data

US 2011/0099093 A1 Apr. 28, 2011

Related U.S. Application Data

(63) Continuation of application No. 12/144,337, filed on Jun. 23, 2008, now Pat. No. 7,885,861.

(51) Int. Cl.
*G06Q 30/00* (2012.01)

(52) U.S. Cl.
USPC .......................................................... 705/26.5

(58) Field of Classification Search
USPC ...................................... 705/26.1, 27.1, 26.5
See application file for complete search history.

(56) References Cited

U.S. PATENT DOCUMENTS

| | | | |
|---|---|---|---|
| 6,414,693 B1 | 7/2002 | Berger et al. | |
| 6,915,273 B1 | 7/2005 | Parulski | |
| 7,072,733 B2 | 7/2006 | Magee et al. | |
| 7,194,327 B2 | 3/2007 | Lam | |
| 7,216,092 B1 * | 5/2007 | Weber et al. | 705/26.5 |
| 2001/0034668 A1 | 10/2001 | Whitworth | |
| 2002/0103701 A1 | 8/2002 | Mowry | |
| 2003/0040976 A1 * | 2/2003 | Adler et al. | 705/26 |
| 2003/0065590 A1 * | 4/2003 | Haeberli | 705/27 |
| 2003/0151611 A1 | 8/2003 | Turpin et al. | |
| 2005/0102151 A1 * | 5/2005 | Fuwa et al. | 705/1 |
| 2005/0261963 A1 * | 11/2005 | McLaughlin et al. | 705/14 |
| 2005/0289018 A1 | 12/2005 | Sullivan et al. | |
| 2006/0184432 A1 * | 8/2006 | Hanechak | 705/27 |
| 2007/0156433 A1 * | 7/2007 | Thorson et al. | 705/1 |
| 2009/0043674 A1 * | 2/2009 | Minsky et al. | 705/27 |
| 2009/0263038 A1 * | 10/2009 | Luo et al. | 382/254 |

OTHER PUBLICATIONS

Nov. 2006—http://www.iproweb.fr/test/0%20-%20MATOS%20GUILLAUME/KODAK%Y020-%20Picturec%20Maker%20Console%20Model%203/DOC%20US.pdf.*

"Photo Montage," Bags of Love, http://web.archive.org/web/20070705071614/http://www.bagsoflove.co.uk/photo-prints/photo-montage.aspx.

* cited by examiner

*Primary Examiner* — Matthew Zimmerman (74) *Attorney, Agent, or Firm* — Jessica Costa (57) ABSTRACT

Automated electronic document design systems and methods for generating matching customized product designs and preparing images of matching customized products in a montage for displaying to a user.

11 Claims, 9 Drawing Sheets

METHOD, MEDIUM, AND SYSTEM FOR AUTOMATED CREATION OF MONTAGE OF MATCHING PRODUCTS

REFERENCE TO PRIOR APPLICATION

This application is a divisional of prior application Ser. No. 12/144,337, filed on Jun. 23, 2008, which is hereby incorporated by reference in its entirety.

FIELD OF THE INVENTION

The present invention relates to computer-implemented systems and methods for automated presentation of matching products.

BACKGROUND OF THE INVENTION

In product marketing, vendors of products seek to present images and descriptions of the products in ways that entice customers to purchase the product. In printed catalogs, a vendor may present an image of an offered product along with a product description and ordering details. With the proliferation of web-based retailers, which allow a user to browse and order products from an online vendor of products, online catalogs are also now quite common.

Branding is a common form of promoting and marketing a business. Successful branding typically requires a multitude of marketing materials, including printed materials such as business cards, letterhead stationery, postcards, magnets, pens, t-shirts and other clothing, as well as non-printed materials such as websites, e-mails, and other electronic media. Successful branding is also facilitated when such marketing materials include a coordinated look and feel, such as the printing of a design having a common logo, a common image, common font, common color scheme, etc.

When a customer orders a product with a customer-specific design from a vendors of marketing materials and other products, the vendor may wish to promote its other products to the user by presenting images of the other products incorporating the customer-specific design to the user. Such products incorporating the same or similar graphic design are referred to as matching products. While a user viewing one or more matching products may appreciate the usefulness of having such a matching product, the user may not fully appreciate the impact of having a full set of matching materials to form a package of marketing materials unless multiple such matching products are presented together. Typical online catalogs depict products individually and not as a full set of matching, in design, yet differing, in product type, products.

SUMMARY

The present invention is directed to systems and methods that provide automated generation of a montage of images of matching products.

In an embodiment, a computer implemented method for generating a montage display of matching products includes steps of receiving a product design to be incorporated into a plurality of different products, the product design comprising a template theme and a customized portion, the template theme having one or more of template graphics, template images, template text and template color scheme, the customized portion comprising one or more of customized graphics, customized images, and customized text inserted into the template by a user of the template, incorporating the product design into respective images of the plurality of different products to generate a plurality of matching product images, and preparing the plurality of matching product images in a montage such that at least some of the customized portion of the design incorporated into each of the plurality of different products is visible.

It is an advantage of the invention that presenting matching customized product designs in a montage conveys a benefit to having multiple coordinated matching products with a matching look and feel for use in a marketing package.

It is an advantage of the invention that the workload required to automatically prepare and present in an aesthetically pleasing arrangement is significantly reduced.

These and other objects, features and advantages of the invention will be better understood with reference to the accompanying drawings, description and claims.

BRIEF DESCRIPTION OF THE DRAWINGS

FIGS. 2-3 and 7-11 show a sequence of screen shots that a user might encounter when ordering a customized product from an online vendor of customized products.

DETAILED DESCRIPTION

Web-based providers of custom products, taking advantage of the capabilities of the World Wide Web and modern Web browsers, operate Web sites that provide online design services for user's desiring to create customized materials from any computer with web access at whatever time and place is convenient to the user. These service providers typically provide their customers with the ability to access the service provider's Web site, view product templates, and use software tools provided by the site to select a template, add images, text, or other content, and perform various modifications to create a customized product design. After the product has been designed by the user, Web-based service providers also typically allow the user to place an order for the production and delivery to the user's home or business of quantities of high quality, printed products of the type that the user is not capable of producing with the printer systems typically connected to most personal computer systems.

One network-based product design system is disclosed in co-owned U.S. Pat. No. 6,650,433, issued Nov. 18, 2003 and entitled "Managing Print Jobs", which is hereby incorporated by reference. The system discloses a downloadable editing tool that allows a customer to create and edit WYSIWYG ("what you see is what you get") markup language documents in the customer's browser. The system makes a number of pre-designed product templates available for customer viewing, downloading, and customizing. The customer can upload the electronic document to a server and place an order for production of the printed products.

Many users of customized products desire to use matching products that present a consistent image to the public, such as business cards, letterhead, return address labels, notecards, sticky notes, pens, t-shirts, websites, and other materials that are visually consistent in image, graphics, color scheme, fonts, and other features. Vendors that make available matching products generally seek efficient and productive ways to promote to its customers the vendor's other matching product offerings.

For example, co-owned and co-pending U.S. application Ser. No. 11/082,543, entitled "Matching Product Marketing System and Method", filed Mar. 17, 2005, incorporated herein by reference for all that it teaches, details a system which allows a product vendor to automatically generate reorder reminders or matching product solicitations to its customer base.

In another example, in co-owned and co-pending U.S. application Ser. No. 10/255,531, entitled "Supplemental Product and Method", filed Sep. 26, 2002, incorporated herein by reference for all that it teaches, vendors may offer matching customized products during the ordering and/or checkout process of another customized product. Thus, a user ordering a set of business cards may be offered a set of matching return address labels or letterhead customized with the user's custom design during the checkout process.

Vendors of matching products desire to present such products to a customer in such a way as to effectively promote the vendor's other matching product offerings so as to enable the user to quickly and easily order additional marketing materials incorporating matching designs for presenting a consistent image to the public.

Figure 1:
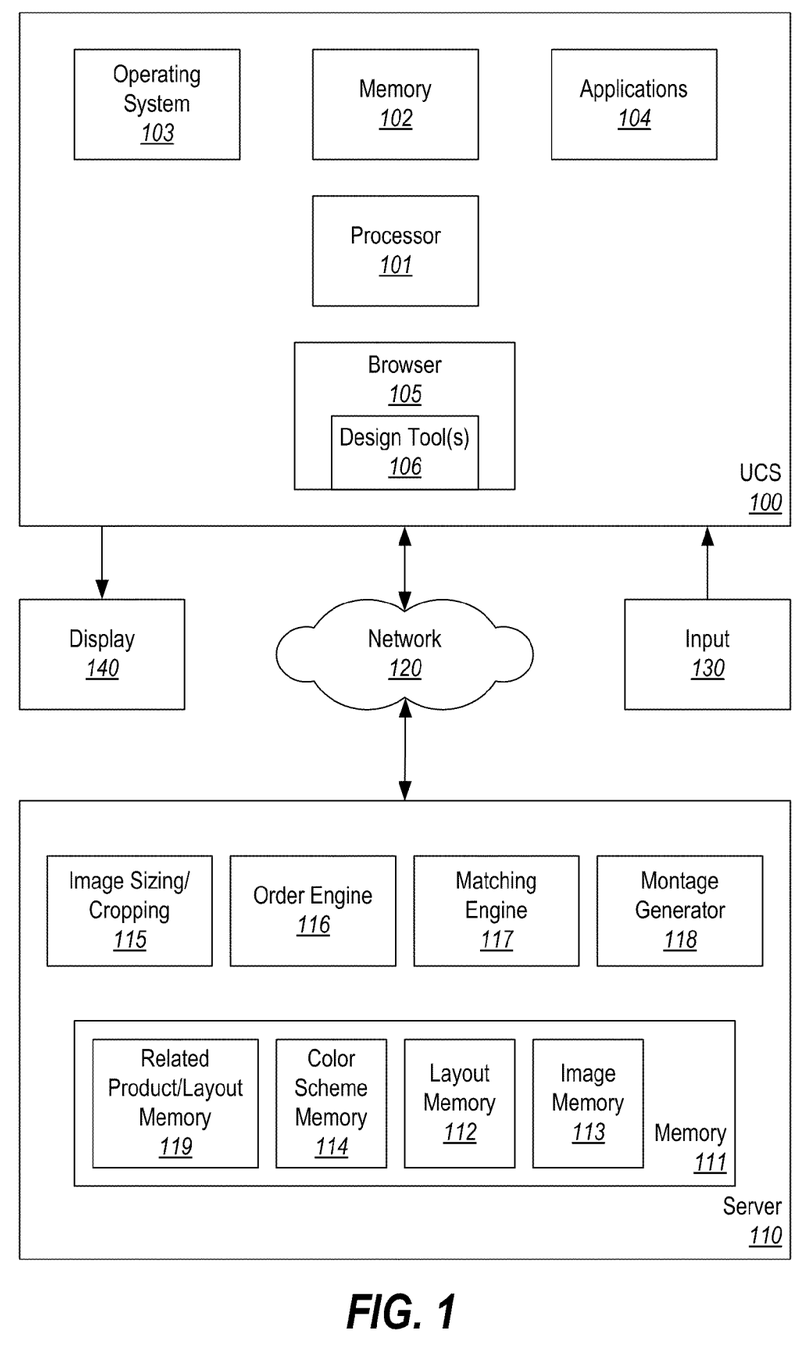
FIG. 1 is a block diagram of a computer system with which the invention may be employed.

Referring now to FIG. 1, an exemplary user computer system UCS 100 includes processor 101 and memory 102. Memory 102 represents all UCS 100 components and subsystems that provide data storage, such as RAM, ROM, and hard drives. In addition to providing permanent storage for all programs installed on UCS 100, memory 102 also provides temporary storage required by the operating system and the applications while they are executing. In a preferred embodiment, UCS 100 is a typically equipped personal computer, but UCS 100 could also be a portable computer, a tablet computer or other device. The user views images from UCS 100 on display 140, such as a CRT or LCD screen, and provides inputs to UCS 100 via input devices 150, such as a keyboard and a mouse.

When UCS 100 is operating, an instance of the UCS 100 operating system will be running, represented in FIG. 1 by Operating System 103. In addition, the user may be running one or more application programs. In FIG. 1, UCS 100 is running Web browser 105, such as Internet Explorer from Microsoft Corporation. Other applications that may be running in UCS 100, such as spreadsheet, e-mail, and presentation programs, are represented as applications 104. In an exemplary embodiment, design tool 106 is a product design program downloaded to UCS 100 via network 120 from remote server 110. Design tool 106 runs in browser 105 and allows the user to prepare a customized product design in electronic form. Alternatively, design tool 106 could have been obtained by the user from memory 102 or from another local source. When the user is satisfied with the design of the product, the design can be uploaded to server 110 for storage and subsequent production of the desired quantity of the physical product on appropriate printing and post-print processing systems. As will be discussed in more detail below, in an embodiment the user creates a custom product design by adding the user's content to a previously designed template prepared by the vendor or service provider. Each template is conceptually a combination of one or more graphics, images, text, fonts, color schemes arranged according to a layout.

While server 110 is shown in FIG. 1 as a single block, it will be understood that server 110 could be multiple servers configured to communicate and operate cooperatively. Memory 111 represents all components and subsystems that provide server data storage, such as RAM, ROM, and disk drives or arrays. Layout memory 112 represents the portion of memory 111 that contains the XML layout descriptions. Each layout specifies the size, position and other attributes of all product elements such as text containers, image containers, graphics, z-index values and so forth. For each different type of product, layouts are provided that combine different numbers of image and text containers in different sizes and arrangements.

In an embodiment, image memory 113 represents the portion of memory 111 that contains the images and related image attributes, such as the image size, the default color scheme associated with the image, and one or more keywords that have been associated with that image by the vendor. Color scheme memory 114 contains the set of color schemes for use in generating templates. A color scheme is a set of pre-selected complementary colors, usually from three to five, pre-selected by the service provider to be applied as a group in a template design. Instead of assigning a fixed color to each template element having a color attribute, each such element in the template will be associated with one of the component positions in whichever color scheme has been selected for use with the template. Image sizing/cropping 115 represents the software tools that receive image container size information from layout memory 112 and image information from image memory 113 and, if possible within established constraints, perform the image resizing and cropping operations to generate one or more image versions of the appropriate sizes for incorporation into one or more identified layouts.

An order engine 116 executes on the server 110 (as shown), or executes remotely but is in communication with the server 110, and operates to manage the ordering and checkout process when a user is ready to submit an order of a customized product design to the vendor. A matching engine 117 executes on the server 110 (as shown), or remotely but in communication with the server 110, and operates to select, and generate a montage of images of customized matching products. The selected set of products may be related to the product associated with the customized product design that was created by the user using design tools 106, or may be selected randomly, pseudo-randomly, or by way of a more complicated algorithm. In any event, the selected set of products will typically not include the product for which the customized product design was originally created for, although this is not necessary.

Figure 2:
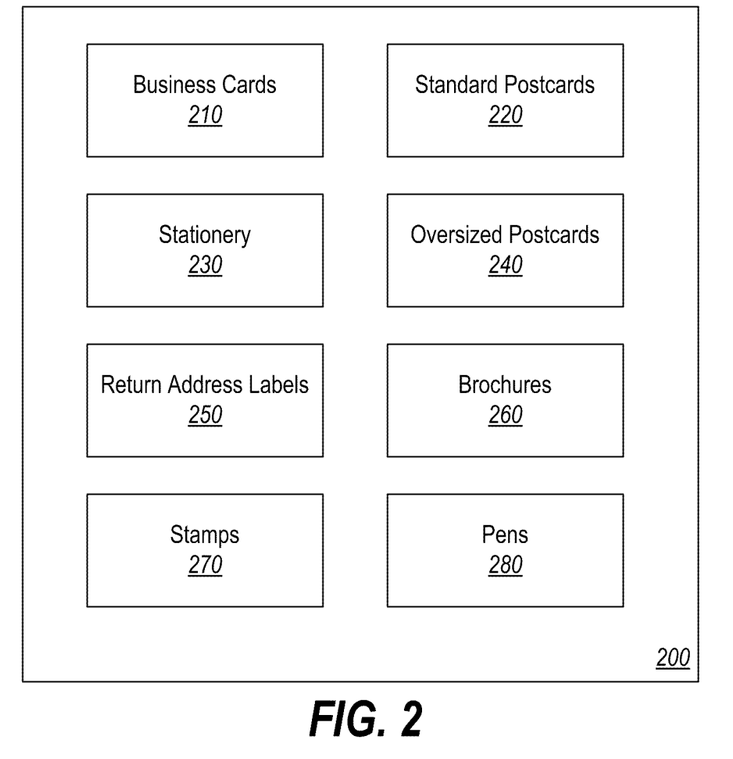

FIGS. 2-3 and 7-11 show a sequence of screen shots that a user might encounter when ordering a customized product from an online vendor of customized products. FIG. 2 is a representation of an introductory web page 200 provided by an online vendor of customized products. As used herein, the term "customized product" refers to a product offered by a vendor that incorporates a graphical des that is designed, at least in part, by the user through the selection, editing, and/or manipulations of text, fonts, images, graphics, and/or colors of a pre-designed design. The page 200 displays and promotes various types of products available from the service provider and offers active controls that allow the user of UCS 100 to select a desired type of product for a more detailed presentation of design options. By way of example, FIG. 2 shows promotional images for business cards 210, standard postcards 220, stationery 230, oversized postcards 240, return address labels 250, and brochures 260, stamps 270, and pens 280. Images or promotions for additional products, such as presentation folders, invitations, announcements, thank you cards, gift tags, and so forth could also be presented on the screen along with other information and links. It will be understood that the invention is not limited to documents that are intended for eventual printing. The documents may also be electronic in their final form, such as electronic business cards, online brochures, websites, and templates for presentation graphics software programs. The customized designs may also be readily incorporated into to a wide range of products that a user may wish to customize, such as t-shirts, hats, and other items of clothing, product containers, promotional goods, and so forth.

Figure 3:
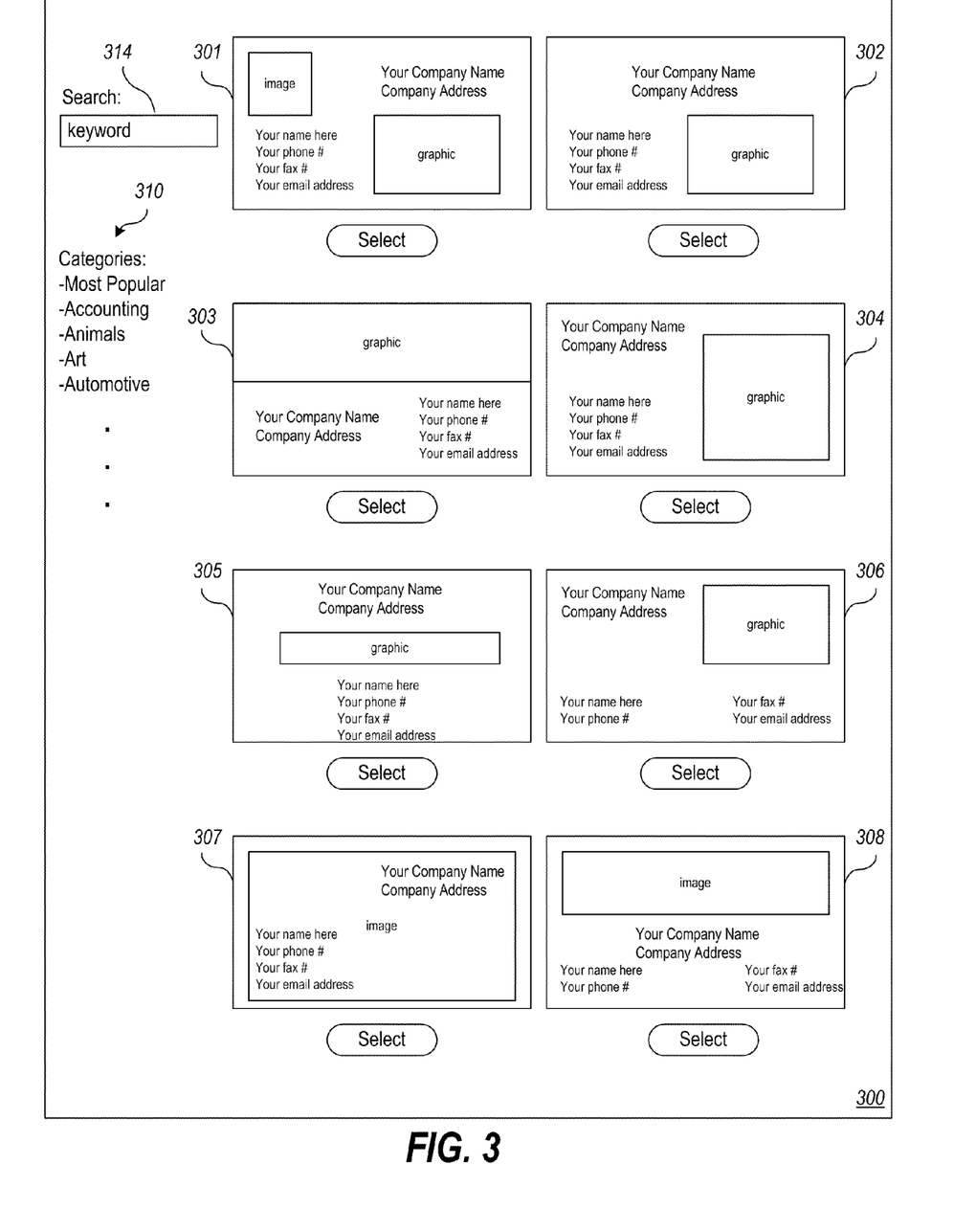

For the purpose of an illustrative example, it will be assumed that the user of UCS 100 desires to create a custom standard business card and, therefore, selects the standard business card option, for example by clicking with the user's mouse cursor on the link associated with the standard business card 210 image. In an embodiment, the links are embedded in the image so that when the user interface detects a click event on the associated image, a page associated with the link is loaded in the browser. Alternatively, the link may be a button or text displayed in connection with the image. Referring to FIG. 3, in response to the user's selection, a page 300 directed specifically to standard sized business cards is retrieved from server 110 and displayed to the user. On this page 300, the user is presented with thumbnail images 301-308 of sample business card template designs. The service provider can choose to present more or fewer than images simultaneously, depending on available display space, the size of thumbnail images used, and the number of available template designs.

To give the user an indication of the types of business card designs that are possible, the vendor may initially present the user with a number of pre-designed default design examples 301-308 containing various combinations of images, graphics, colors and arrangements to give the user a range of visual appearances. To allow the vendor to present the user with candidate product templates that are relevant to the user's intended purpose for the cards, the page 300 may include a list 310 of selectable categories, wherein upon selection of a particular category (for example by clicking on the category link), a set of design examples relevant to the selected category are displayed to the user in place of the default design examples 301-308. Other types of selection means could be readily employed. For example, a tool 314 could be implemented as a search field where the user types in one or more terms to be compared with the keywords associated with stored images. Tools could also be implemented to contain additional filters for allowing the user to narrow the search according to certain image characteristics or content. For example, check boxes or another menu could be provided to allow the user to request templates with only photographic images or only illustrations.

One or more designs 301-308 may include zero or more images. The number of image choices offered in a design may vary among the product types depending on the variety of layouts prepared by the vendor for each product type. For example, layouts for a relatively large product, such as an 8½ by 11 brochure could be designed by the vendor to contain a greater number of images than smaller products such as a business card or standard size postcard.

Figure 4:
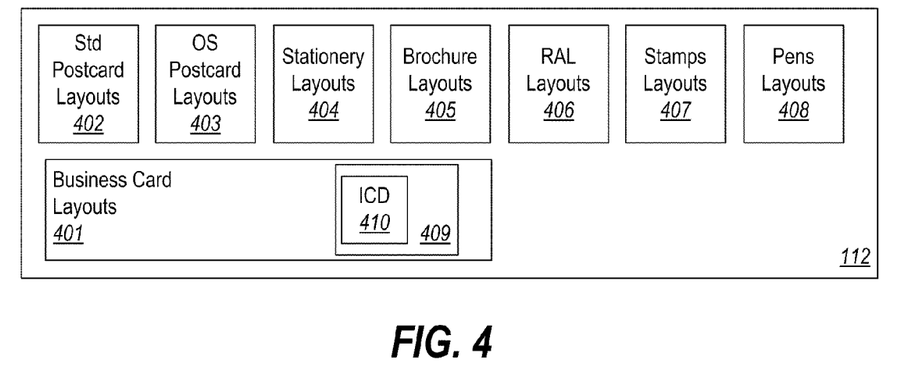
FIG. 4 is a representation of an organization of layout memory 112.

Referring now to FIG. 4, the contents of an embodiment of layout memory 112 will be discussed in more detail. Each of the various types of products, such as business cards, postcards, brochures and so forth, has a different combination of organizational requirements and physical dimensions. Layouts are, therefore, conceptually organized in layout memory 112 according to the type of product. For the set of products shown in FIG. 2, layout memory 112 will have business card layouts 401, standard postcard layouts 402, oversized postcard layouts 403, stationery layouts 404, brochure layouts 405, return address label layouts 406, stamps layouts 407, and pens layouts 408, each of which contains a plurality of layouts for the associated type of product. For example, business card layouts 401 contains a plurality of individual XML layout descriptions 409. Within each individual layout description is information defining the number of image containers in that layout, the size and location of each of image container, the z-indices of the containers, and the image container that contains the dominant image. This set of information in layout 409 is collectively represented in FIG. 4 as image control definition (ICD) 410.

In one embodiment, for example described in co-owned U.S. patent application Ser. No. 10/679,028, U.S. Publication No. 2005-0075746 A1, hereby incorporated by reference herein for all that it teaches, templates are constructed from a combination of separate components and attributes. Templates are separated into layouts, images available for placement in the layouts, fonts, and template color schemes. This approach allows candidate templates to be assembled dynamically using images that are associated with the keyword entered by the user and, therefore, are likely to be relevant to the user's interests.

In addition to images, many templates will have various additional elements, such as lines, shapes, and graphic elements. Each of these elements will typically have one or more associated colors. If fixed colors are assigned to these non-image elements, or if colors are assigned randomly, there is a likelihood that some images will have colors that are not visually compatible with adjacent colors, creating an unappealing template. Assigning colors to template components is, therefore, advantageously handled by way of a separately controlled template color scheme. Techniques for defining and using color schemes are well known in the art.

In an embodiment, a color scheme indicator is assigned to each image group. This indicator references a color scheme that contains colors selected by the service provider to be pleasing if presented adjacent to the images in the image group. In an embodiment, one of the image containers in each layout is identified as the container for the dominant image in the layout. The color scheme that is associated with the image placed in the dominant image container controls the color scheme used for graphics and other template components having color attributes.

To facilitate image and layout modularity and combinability, all layouts are designed with standard pre-defined image container sizes and all images are made available in at least some of the same standard sizes. The number of different standard image containers used and the exact size of each container is a discretionary choice of the vendor or other template creator.

The default business card designs 301-308 depicted in FIG. 3 illustrate a few examples of the many possible business card layouts. Layouts vary both by the size and shape of the image and text containers and by the location of the image and text containers. For this reason, multiple layouts may use the same size image container, with each layout having the image container located in a different position.

Figure 5:
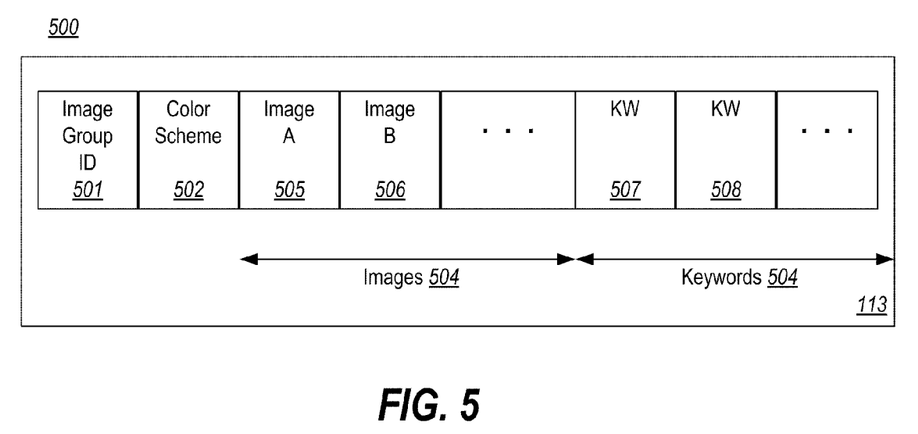
FIG. 5 is a representation of an organization of image memory 113.

Referring now to FIG. 5, the contents of image memory 113 will be discussed in more detail. Images are conceptually stored in image memory 113 as image groups. An image group is a set of different versions of a parent, or base, image. The different versions are created by the vendor or service provider by taking the base image and performing cropping operations, or a combination of zooming and cropping, to create a set of image versions designed to fit some or all of the standard image container sizes. Unlike layouts, which are typically designed especially for each particular type of product, image groups are made available for use with most, or all, different product types. This allows a user to present a consistent image by creating multiple different types of materials and products that all contain versions of the same base image. An image group will, therefore, typically contain images ranging in size from small images, suitable for use in smaller products such as return address labels, to larger images, suitable for use in larger products, such as stationery, brochures and presentation folders. Because the subject matter content of some base images may not lend itself to certain image container shapes, it is likely that all image groups will not have exactly the same set of component images sizes.

Referring again to FIG. 5, image memory 113 contains a large number of image groups. A representative image group is indicated in FIG. 5 as image group 500. Image group 500 has an image group identifier 501 and an associated color scheme indicator 502. Indicator 502 is assigned by the service provider based on the major color or colors in the image and identifies one of the color schemes in color scheme memory 114. Each image group also references a number of images 503. As mentioned above, each of the individual images in images 503 is a variation of a base image. Each image group in memory 113 further has one or more associated keywords 504 provided by the service provider to assist the user. Keywords 504 are members of the overall universe of keywords presented to the user by keyword tool 314.

When an image is placed in the dominant image container in the layout, the color scheme indicator 502 associated with that image group is used to identify the color scheme to be used to create the template. If the layout has only one image container, the image placed in that container will, by default, be the dominant image and the color scheme associated with that image will be used to control the colors of other template components, such as text and graphic components. If the layout contains multiple image containers, one of the containers will be designated as the dominant container for that layout. Generally, the largest or most prominent container in the layout will be designated as dominant, but dominant status can be assigned to any image container in the layout.

Figure 6:
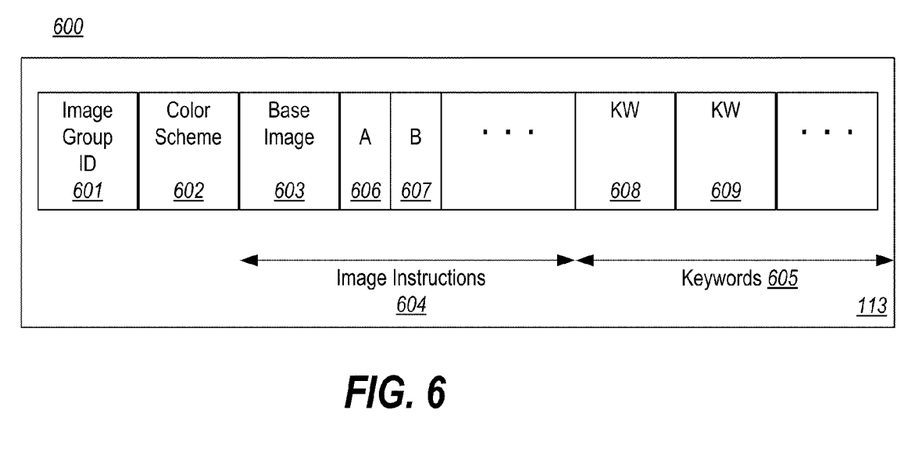
FIG. 6 is a representation of an alternate organization of image memory 113.

Referring to FIG. 6, an alternative embodiment of image memory 113 is depicted. Each image group 600 has a group ID 601, color scheme 602 and associated keywords 605, 608, 609, as described above in connection with FIG. 5. Instead of the system storing multiple base image variations, only base image 603 and a plurality of image instructions 604 are stored for each image group. Each of the image instructions 604 contains the information necessary to create a base image variation, for example as described in detail in co-owned U.S. Pat. No. 7,339,598, issued on Jun. 2, 2008 and entitled "System and Method for Automated Product Design", and in co-owned U.S. Pat. No. 7,133,050, issued on Oct. 18, 2006 and entitled "Automated Image Resizing and Cropping", both of which are hereby incorporated by reference for all that they teach.

The use of image groups facilitates the automatic generation of matching customized products. When a customized product design is created by a user, the vendor may automatically generate and present to the user a number of images of proposed customized matching products that the user may be interested in also ordering. A matching engine 117 executing on the server 110 selects a set of products from the universe of available products through the server. The selected set of products may be related to the product associated with the customized product design that was created by the user, or may be selected randomly, pseudo-randomly, or by way of a more complicated algorithm. In any event, the selected set of products will typically not include the product for which the customized product design was originally created for, although this is not necessary.

Figure 7:
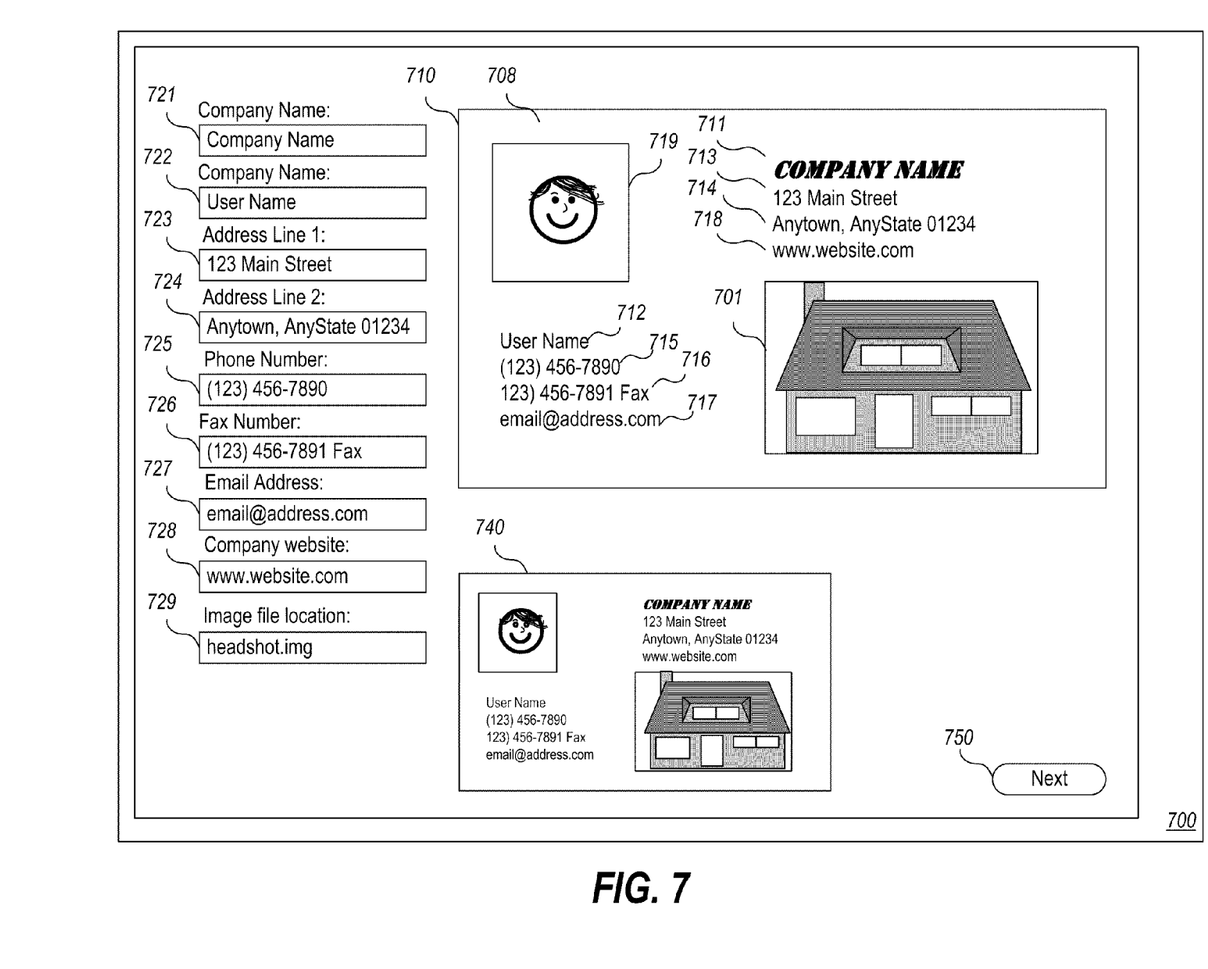
FIG. 7 is a screen shot displaying an exemplary embodiment of a customization window.
Figure 8:
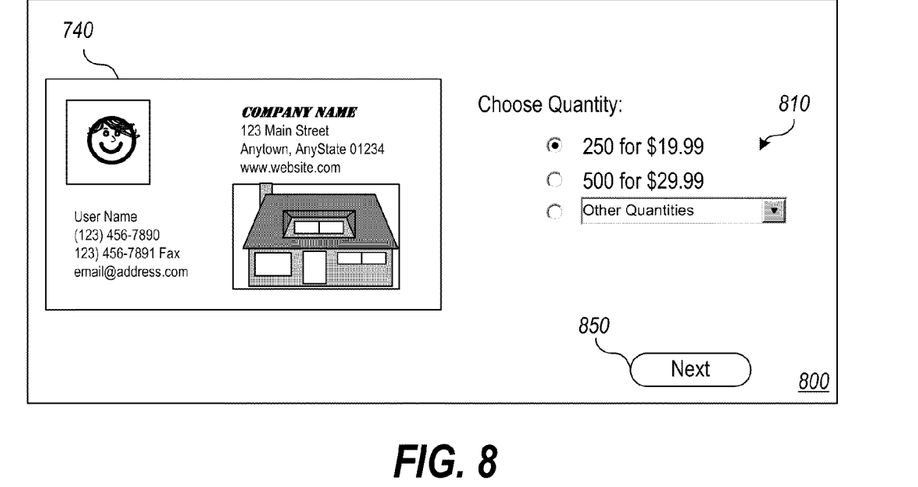
FIG. 8 is a screen shot displaying an exemplary embodiment of a quantity selection window.
Figure 9:
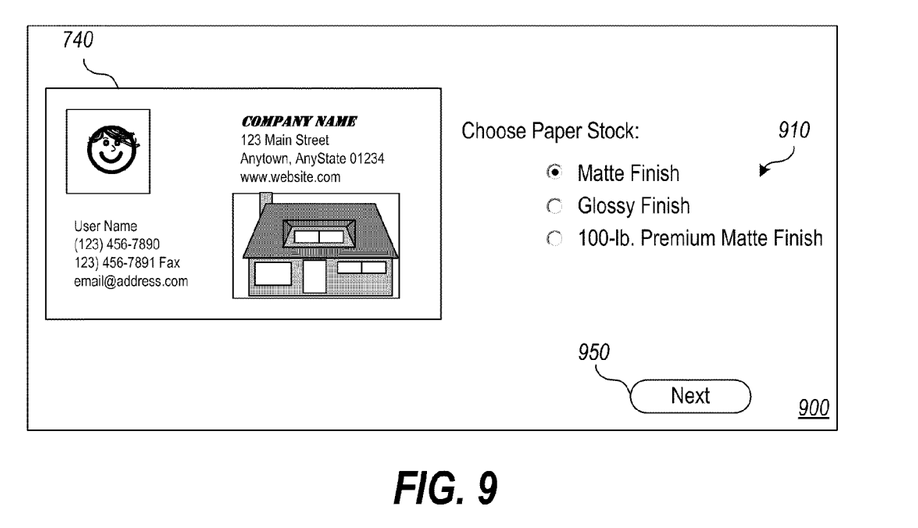
FIG. 9 is a screen shot displaying an exemplary embodiment of a paper stock selection window.

Referring again to FIG. 3, to select a desired template, the user clicks on the Select button in FIG. 3, associated with the desired template to arrive at the next screen—a customization window 700 as shown in FIG. 7. As depicted in FIG. 7, the customization window 700 includes a design work space 710 where a design image 701 may be designed. In this example, the design image 701 is the combination of a graphical image 704 depicting a logo image and several pre-defined text images 705, 706 displayed on a background 708. In the depicted example, the online vendor has initially provided default text images 711-719 with the placeholder text "Company Name", "User Name", "Address Line 1", "address Line 2", "Phone", "Fax", "E-mail", "Web Address", to give the user an indication of the relative size and location of where and how the user's text entries will appear.

The product design page 700 may also include a product image 740. Product image 740 depicts the selected product in combination with the design image 701 and indicates the appearance of the finished printed product. While the design image 701 is editable, allowing the user to select and edit the text and image containers, the product image 740 is not editable and merely depicts the final product having the design incorporated into the product. When the product is a business card, as in the illustrative example, the product image 740 may be identical in appearance to the editable design 710. However, when the design in the work area 710 is to be printed on or otherwise incorporated as only part of another product, such as in the case of printing the design onto a t-shirt or hat, the advantage of displaying the product image 740 will be more apparent. In FIG. 7, product image 740 is an image of a business card, corresponding to the product being customized with the user specified information.

In one embodiment, each of the text and image containers in the template are directly editable in the work area 710. Alternatively, or in addition, text entry fields 721-728 may be provided outside of the work area 710 to allow the user to customize the text entries of the corresponding text images appearing in the design shown in the design area 710. The text entered by the user may include letters, numbers, punctuation marks or other symbols as supported by the vendor and/or site operator. All characters of all types entered by the user are collectively referred to herein as "text". Images corresponding to the user's text are created at server 110, returned to UCS 100 and rendered by tools 106 at the appropriate locations 711-719 in the design, as dictated by the respective locations of the corresponding text containers in the design work area 710.

As described previously, when the user enters text in the text entry fields 721-728, or directly edits the text containers containing the text for the text images 711-718, the edits are sent to the server 110 which re-renders the design and returns the updated product image 740 to the UCS 100 for display to the user.

After the user has edited the design of the product in the customization window 700, the user presses the Next button 750 to arrive at the next screen. While the next screen presented to the user may vary depending on the ordering options made available to the user and the presentation order selected by the vendor, in the illustrative example the next screen is a quantity selection window 800, shown in FIG. 8. In the quantity selection window 800, the user designates the quantity of product for the order. For example, in the illustrative example, business cards may be ordered in incremental quantities, 250, 500, etc. The user may select the desired quantity, for example, by selection of a radio button (as shown) 810 or a checkbox corresponding to the desired quantity, or other quantity indication means.

Upon selection of the desired quantity, the user presses the Next button 850 to arrive at the next screen. In the illustrative example the next screen is a paper stock selection window 900, shown in FIG. 9. In the paper stock selection window 900, the user designates the type of paper on which the business cards are to be printed. For example, in the illustrative example, business cards may be printed on standard paper, premium paper, with or without a matte finish or a glossy finish. The user may select the desired paper stock, for example, by selection of a radio button (as shown) 910 or a checkbox corresponding to the desired quantity, or other quantity indication means.

Additional screens may be presented to the user, such as selection/design of a back side of the business card, optional accessories and offers. In accordance with the present invention, at least one screen is presented to the user offering matching customized products presented in an aesthetic montage in which multiple images of different matching products are arranged relative one another such that at least some of the customized content is visible to the user.

Figure 10:
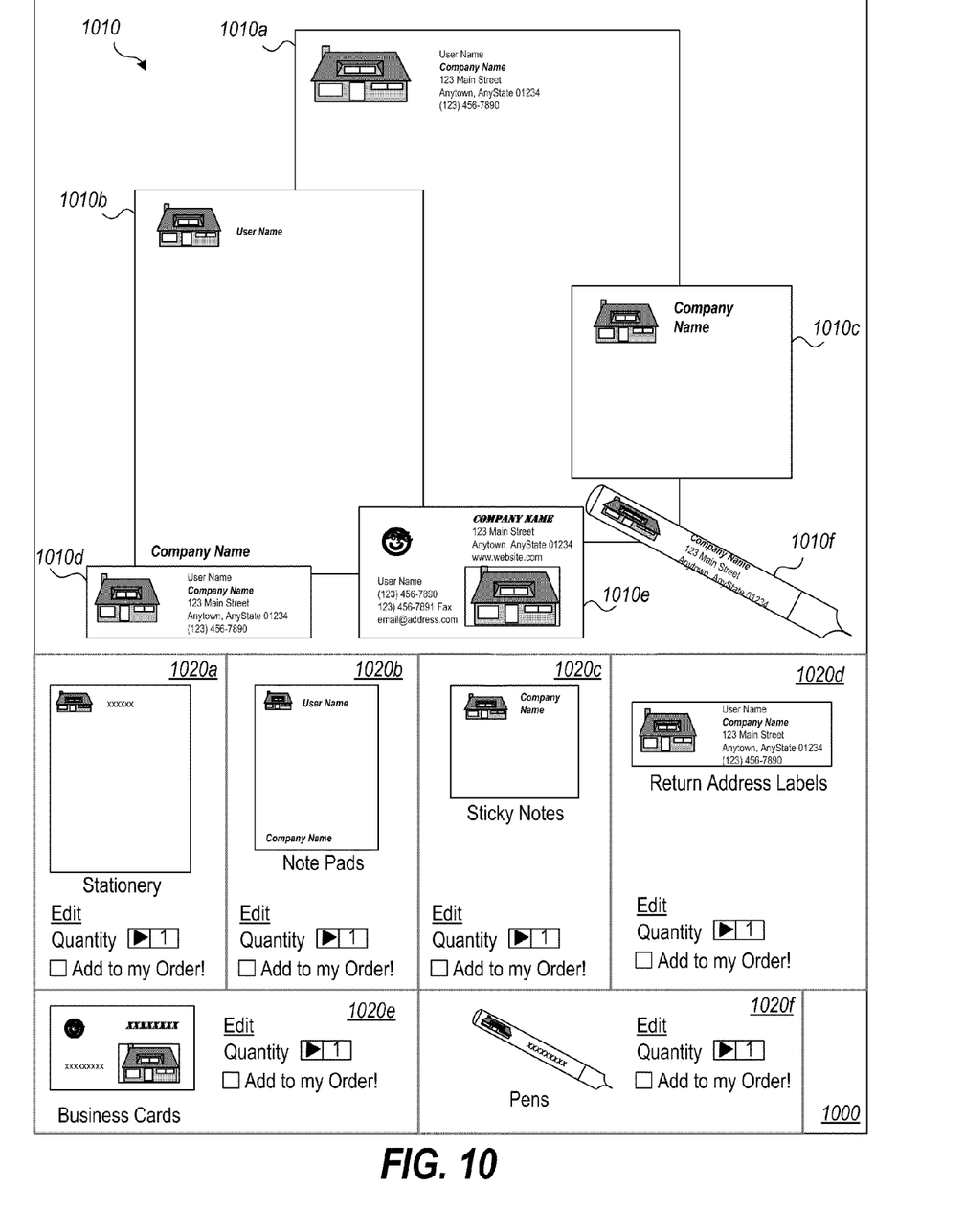
FIG. 10 is a screen shot displaying an exemplary embodiment of a matching products window, including a montage displaying a plurality of matching customized products.

FIG. 10 depicts an illustrative embodiment of a screen presented to the user, preferably during the ordering/checkout process of a customized product, which contains a matching products window 1000. The matching products window 1000 includes a montage 1010 of matching customized products 1010*a*, 1010*b*, 1010*c*, 1010*d*, 1010*e*, 1010*f*. The methodology used to generate the montage 1010 is discussed hereinafter. The matching products window 1000 also includes at least one mechanism which allows the user to find out more information about a product offered as a matching customized product and to order such product. For example, in FIG. 10, the matching products window 1000 includes a panel 1020*a*, 1020*b*, 1020*c*, 1020*d*, 1020*e*, 1020*f* below the montage 1010 for each matching customized product 1010*a*, 1010*b*, 1010*c*, 1010*d*, 1010*e*, 1010*f* displayed in the montage 1010. Each matching customized product panel 1020*a*, 1020*b*, 1020*c*, 1020*d*, 1020*e*, 1020*f* includes (as shown in panel 1020*d*) a description of the product 1030, preferably including at least a thumbnail image 1032 of the complete product, a link 1034 to a studio page which, when loaded in the browser, allows the user to edit the customized details of the matching product, a quantity selector 1036, and an "Add to my Order" checkbox 1038 allowing the user to quickly add the matching product to the user's total order.

The montage 1010 is an image of an arrangement of matching products that are automatically generated at the server 110, without request by the user ordering a customized product, and then automatically arranged in an aesthetically pleasing arrangement. Such a montage 1010 is useful in conveying to the user the impact that a coordinated look and feel of multiple matching products can have, which may be helpful to the user in establishing a package of coordinated marketing materials.

After the customized product design has been finalized and product parameters (e.g., quantity, paper stock, etc.) and any associated matching customized products have been selected, the user clicks the Next button 1050 and one or more shipping and payment information windows (not shown) are presented, allowing the user to select a desired shipping address and method, and a method of payment and associated verification information. Upon submission of an order, the user may be presented with an order confirmation window (not shown) to allow the user to view and confirm the order including the customized product(s) selected and their respective parameters and options, and the shipping and payment information.

In order to present such a montage 1010 of matching customized materials to a user, the server 110 includes (or is in communication with) a matching engine 117 and a montage generation engine 118. The matching engine 117 selects products, less the product currently ordered by the user, from the universe of customizable products available from the vendor. For each of the selected products, the matching engine 117 automatically generates an image of the selected product customized with at least some customized information (e.g., name, address, image, etc.) from the original product. For example, if the user is currently ordering business cards, the matching engine 117 may select a set of related products including business card magnets, sticky notes, note pads, and letterhead stationery. For each related product, the matching engine 117 may automatically generate an image of a matching customized product comprising the related product customized with at least some customized information from the business card product and including common themes such as color schemes, images, graphics, etc. from the selected business card template itself.

In an embodiment, the matching engine 117 is configured with related layout information. In an embodiment, the related layout information is an SQL relational database comprising layout IDs mapped to products and related product layout IDs. Thus, a layout ID may be assigned to a given product. Given the layout ID and product, the matching engine may access the relational database to identify a related layout ID of a different product. Thus, for example, if a business card layout having an associated layout ID is selected by the user, a business card magnet layout having a related layout ID may be selected and user-customized information such as user text entries and user image entries may be automatically inserted in corresponding text and image containers in the business card magnet layout. The matching engine 117 then renders the automatically customized business card magnet layout to generate a corresponding image of the matching customized business card magnet. Because layouts comprising similar themes (e.g., having at least some common graphics, color schemes, images, etc.) for different (and optionally for same) products are associated with one another in the Related Product Memory 119, layouts for related products may be identified and customized using user-customization information from other product orders to automatically generate matching customized products that have the same look and feel as the originally ordered customized product.

Once the matching customized product images 1010*a*, 1010*b*, 1010*c*, 1010*d* have been generated by the matching engine 117, the montage generation engine 118 arranges the matching customized product images into a montage that displays each of the selected matching products such that at least some of the customized portion of the design incorporated into each of the plurality of different products is visible. Thus, while portions of the plurality of product images 1010a, 1010b, 1010c, 1010d in the montage 1010 will typically overlap one or more other images in the set of matching customized product images, the customized portions of the products remain visible to the user. In addition, at least some of the common theme elements (e.g., graphic elements, image elements, text elements, color scheme, etc.) shared by the templates used to create the user-customized product design and the automatically-created matching product designs are also visible to the user such that a user viewing the montage can easily perceive that the products displayed in montage match one another as well as the customized product that was designed by the user.

Figure 11:
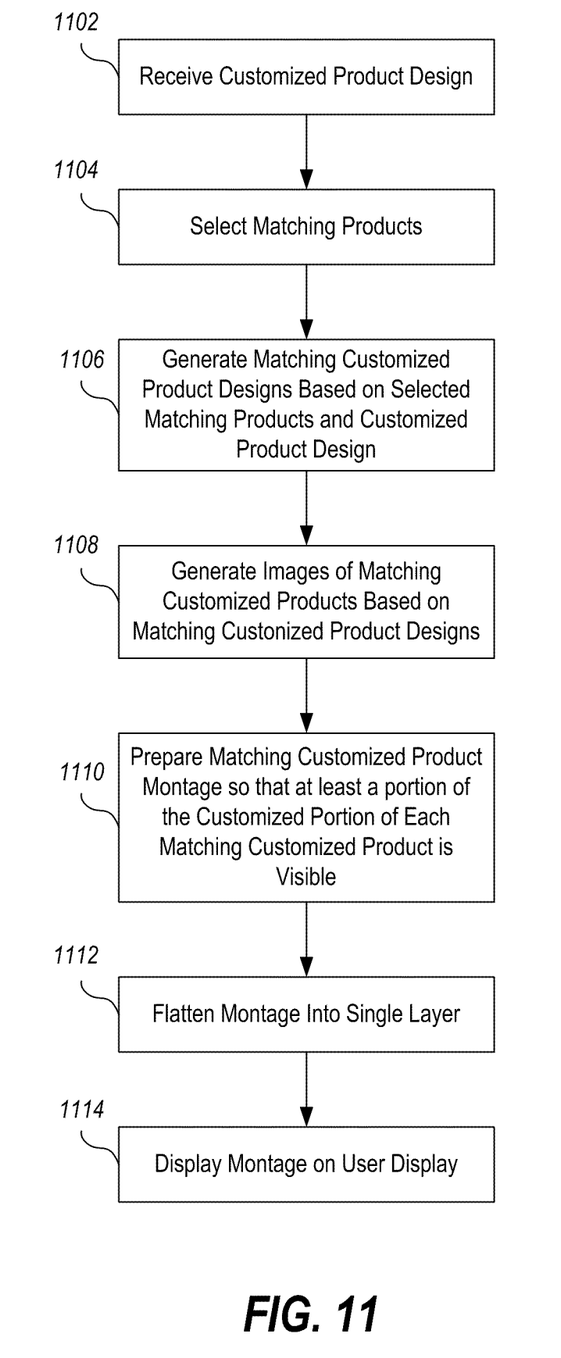
FIG. 11 is a flowchart illustrating an exemplary embodiment of a method of operation of a system in generating the montage.

FIG. 11 describes the operation of the system in generating the montage. As illustrated, a system, such as the server 110 receives a customized product design (step 1102). The customized product design includes a standard portion, for example as determined by a template design, and a customized portion which may be edited and customized by a user. Based on the customized design, the system, for example the matching engine 117 executing on, or in communication with, the server 110, selects a set of products for which customized designs that match the received customized product design will be generated (step 1104). In an embodiment, the set of selected products may be selected randomly from the entire set of available customizable products from the online vendor, or may be selected according to a smart algorithm. For example, in an embodiment, the products may be selected based on category. The entire set of products available from the online vendor may be categorized into several product types, for example office supplies, clothing, gifts, etc. When the received customized product design is for a product of one category, the smart algorithm may search the available products and select other products from the same category. Alternatively, the smart algorithm may select different products from each of the different categories. Although a few examples of the matching algorithm are hereby presented, it is to be understood that the matching algorithm may be any algorithm that selects a set of different products that may be automatically customized and presented to the user.

Upon selection of the set of products from which matching customized product designs are to be generated, the matching customized product designs for each of the selected products are then automatically generated (step 1106). As previously described, in one embodiment, the template and customized content of the received customized product design are utilized to locate a related template for each selected product and to incorporate at least some of the customized content into corresponding image and text containers of the related template to thereby populate the related template and generate a customized product design for the selected product that matches the customized product being ordered by the user. After generating a matching customized product design, an image of the matching customized product incorporating the matching customized product design is generated (step 1108).

Once the set of matching customized product images is generated (from step 1108), the images are arranged in a montage so that at least a portion of the customized portion of each matching customized product is visible to the user when the montage is displayed on the user's display screen (step 1110). The montage comprising the arranged images may be flattened into a single layer (step 1112), stored if desired, and sent to the UCS 100 for display to the user (step 1114).

Figure 12:
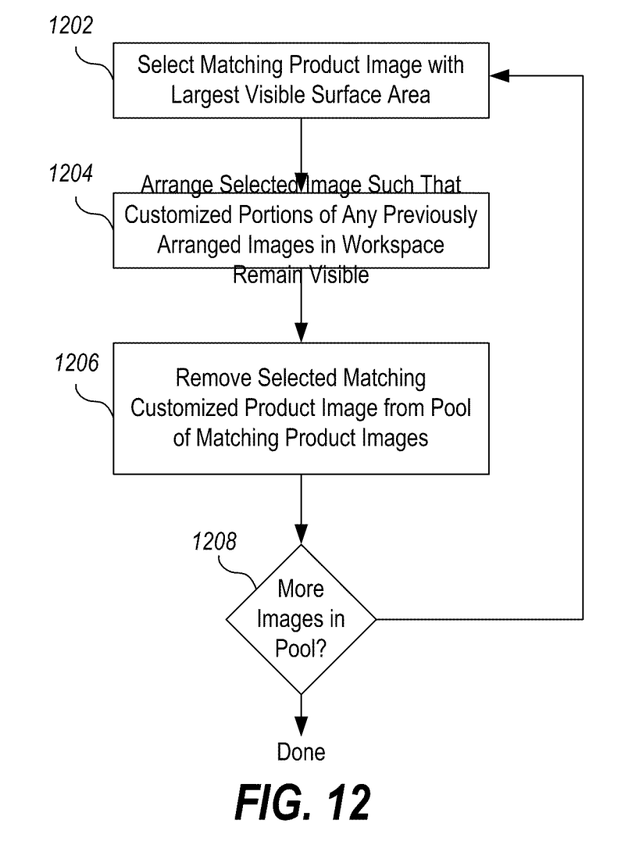
FIG. 12 is a flowchart illustrating an exemplary embodiment of a method for preparing a plurality of matching customized product images into a montage.

FIG. 12 is an exemplary embodiment of a method for arranging the matching customized product images in a montage. In this embodiment, the montage generation engine 117 selects a matching customized product image from the set of matching customized product images that is characterized by the largest visible surface area of the product depicted therein (step 1202). The selected image is arranged in an electronic workspace, such as a document, such that the customized portions of any previously arranged matching product images in the workspace remain visible (step 1204). Once a matching customized product image is selected and arranged in the montage, it is removed from the set of available matching customized product images from which to choose (step 1206). The steps (1202 through 1206) are repeated until all customized product images are arranged in the montage (step 1208). Of course, it will be appreciated that to maximize the marketing value of the montage, the arrangement of each product image in the montage should be such as to allow the product represented therein to be ultimately recognizable. As such, while the product images may be arranged such that portions of some images may overlap portions of other images, the arrangement should be such as to allow more than half of the outline of each product to remain visible in the display.

Figure 13:
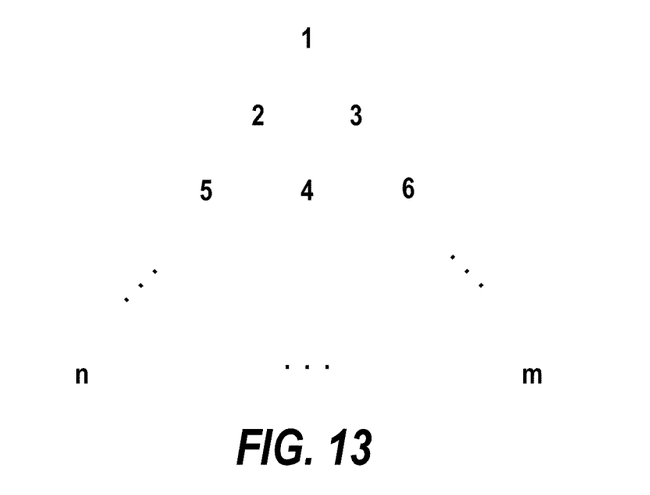
FIG. 13 is an exemplary pattern and order in which matching customized product images are arranged in a montage.

Thus, in one exemplary embodiment, the matching customized product images are arranged in a sort-of "bowling pin" arrangement, as illustrated in FIG. 13, whereby the product images are sorted by size of image of product (where "1" in FIG. 13 is the largest image, "2" is the next largest image, "3 is the next largest image, and so on), and then arranged as shown in FIG. 13 according to size. Thus, the largest image "1" is centered at the top of the montage with a z-index value placing the image "1" at the back layer. The next largest image "2" is centered on the left edge of the product behind it, with a z-index placing the image "2" just in front of the z-index layer of image "1". If the image "2" is wider than the product image "1" behind it, the right edge of image "2" is placed on the center line of the product behind it. The next largest image "3" from image "2" is centered on the right edge of the product behind it. If the image "3" is wider than the product image "1" or "2" behind it, the left edge of image "3" is placed on the center line of the product behind it. The next largest image "4" from image "3" is centered below images "2" and "3", with the top edge below the customized portions of the product designs in the respective images. The placement continues in a like fashion, whereby images may be continued to be added to the montage, growing from the top down. The z-index value associated with each image "1" through "n", is incremented for each image inserted into the montage.

The size of the products in the montage are preferably the "natural preview size" of the products, whereby given an image container, the product size within the image occupies as much of the image container as possible without distorting or cropping the product in the image. Smaller products may appear larger relative to larger actual products because larger products may be "capped" such that they are drawn smaller than actual relative size in the montage. To achieve a balanced appearance in the montage, one or more of the respective matching customized product images may be resized to a different size such that the resized matching product image is not representative of the respective size of the corresponding actual product relative to the sizes of the actual products corresponding to the non-resized matching product images.

In an alternative embodiment, the products selected for a montage are pre-selected as a default set of products and associated with a given product. The pre-selected set of products associated with each product may vary depending on the product. A set of empty containers, each operating as a position holder and into which is inserted customized user information, may be pre-generated and updated, or populated at user's run-time with the user's customized information upon receipt of the user's information.

While the invention has been described in various exemplary embodiments, the described embodiments are to be considered as illustrative rather than restrictive. The scope of the invention, therefore, is as indicated in the following claims and all equivalent methods and systems.

What is claimed is:

1. A computer implemented method for displaying a montage display of matching products, comprising:
   receiving by one or more processors user selection of a template theme and user selection of customized content, the template theme comprising at least one of a group of template components consisting of template graphics, template images, template text and template color schemes, and the customized content comprising at least one of the group of customized components consisting of user-selected graphics, user-selected images, user-selected text and user-selected color schemes;
   combining by one or more processors the selected template theme with the user-selected customized content to generate a product design;
   transmitting by one or more processors the product design to one or more server computers, the one or more servers incorporating at least a portion of both the selected template theme and the user-selected customized content into a plurality of images of different products which generates a plurality of composite product images of the plurality of different products, and which further generates a single page montage of the plurality of composite product images such that at least a portion of the product design as incorporated into each of the plurality of different products is visible and at least a portion of a composite product image in the plurality of composite product images is not visible;
   receiving of the montage by the user computer; and
   displaying of the montage to the user on a display screen.

2. The method of claim 1, wherein at least a portion of the plurality of product images in the montage overlap one another.

3. The method of claim 1, wherein respective sizes of the plurality of composite product images relative to one another are representative of respective sizes of actual products corresponding to the plurality of composite product images relative to one another.

4. The method of claim 1, further comprising,
   providing on the display screen at the user computer at least one mechanism which allows the user to find out more information about a product offered as a matching customized product and to order said matching customized product.

5. The method of claim 1, the method further comprising,
   providing a link on the display screen at the user computer which allows the user to order one or more products corresponding to at least one of the composite product images displayed in the montage.

6. Non-transitory computer readable storage tangibly embodying program instructions which, when executed by a computer, implement a method for displaying a montage display of matching products, comprising:
   receiving by one or more processors user selection of a template theme and user selection of customized content, the template theme comprising at least one of a group of template components consisting of template graphics, template images, template text and template color schemes, and the customized content comprising at least one of the group of customized components consisting of user-selected graphics, user-selected images, user-selected text and user-selected color schemes;
   combining by one or more processors the selected template theme with the user-selected customized content to generate a product design;
   transmitting by one or more processors the product design to one or more server computers, the one or more servers incorporating at least a portion of both the selected template theme and the user-selected customized content into a plurality of images of different products which generates a plurality of composite product images of the plurality of different products, and which further generates a single page montage of the plurality of composite product images such that at least a portion of the product design as incorporated into each of the plurality of different products is visible and at least a portion of a composite product image in the plurality of composite product images is not visible;
   receiving of the montage by the user computer; and
   displaying of the montage to the user on a display screen.

7. The non-transitory computer readable storage of claim 6, wherein at least a portion of the plurality of product images in the montage overlap one another.

8. The non-transitory computer readable storage of claim 6, wherein respective sizes of the plurality of composite product images relative to one another are representative of respective sizes of actual products corresponding to the plurality of composite product images relative to one another.

9. The non-transitory computer readable storage of claim 6, the method further comprising,
   providing on the display screen at the user computer at least one mechanism which allows the user to find out more information about a product offered as a matching customized product and to order said matching customized product.

10. The non-transitory computer readable storage of claim 6, the method further comprising,
    providing a link on the display screen at the user computer which allows the user to order one or more products corresponding to at least one of the composite product images displayed in the montage.

11. An apparatus for displaying a montage display of matching products, comprising:
    one or more server computers configured to receive user selection of a template theme and user selection of customized content, the template theme comprising at least one of the group of template components consisting of template graphics, template images, template text and template color schemes, and the customized content comprising at least one of the group of customized components consisting of user-selected graphics, user-selected images, user-selected text and user-selected color schemes, the one or more server computers further configured to combine the selected template theme with the user-selected customized content to generate a product design;

a network connection over which the product design is transmitted to the one or more server computers;

wherein the one or more server computers are further configured to incorporate at least a portion of both the selected template theme and the user-selected customized content into a plurality of images of different products which generates a plurality of composite product images of the plurality of different products, and which further generates a single page montage of the plurality of composite product images such that at least a portion of the product design as incorporated into each of the plurality of different products is visible and at least a portion of a composite product image in the plurality of composite product images is not visible; and wherein the one or more server computers are further configured to transmit the montage to a user computer for display on a display screen coupled to the user computer.

* * * * *